T. V. NUTTER.
PORTABLE HAND WINDLASS.
APPLICATION FILED JULY 6, 1920.
1,386,582.
Patented Aug. 2, 1921.
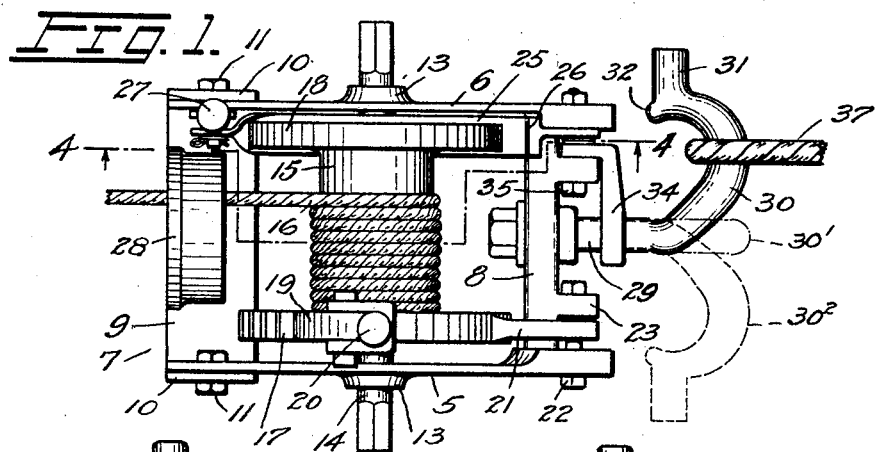
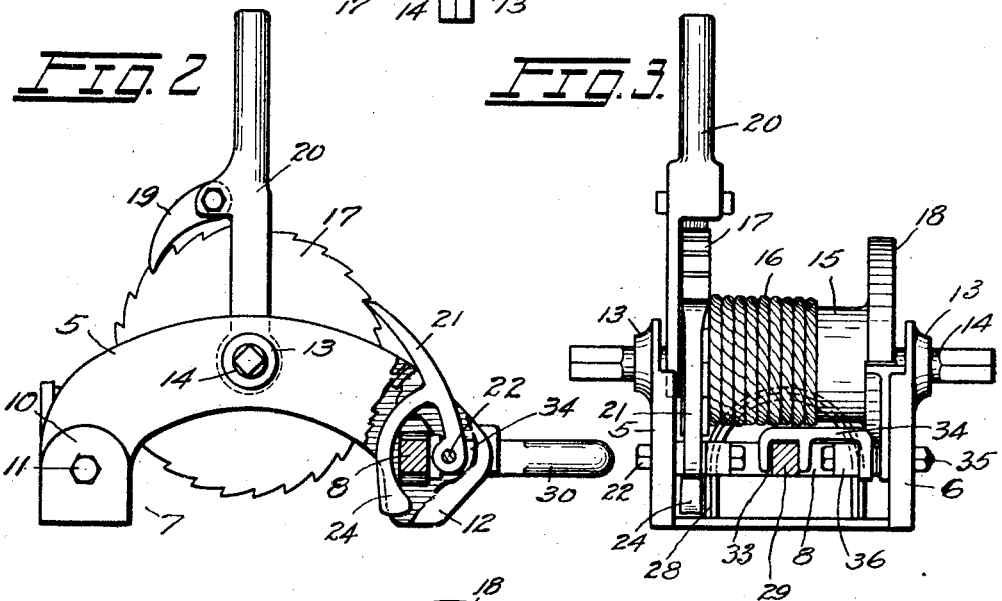
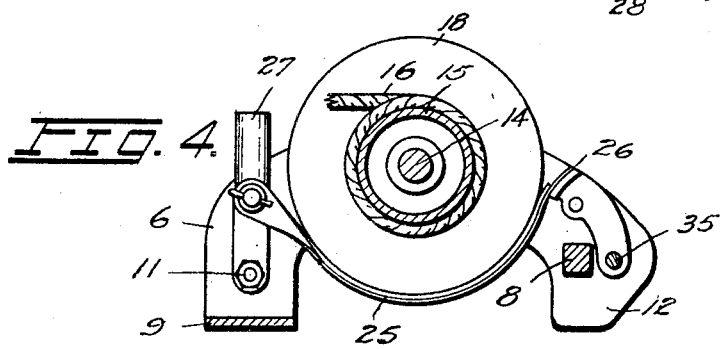
Inventor:
Theodore V. Nutter
By his Attorney
Pierre Barnes

UNITED STATES PATENT OFFICE.

THEODORE V. NUTTER, OF SEATTLE, WASHINGTON.

PORTABLE HAND-WINDLASS.

1,386,582.  Specification of Letters Patent.  Patented Aug. 2, 1921.

Application filed July 6, 1920. Serial No. 394,026.

*To all whom it may concern:*

Be it known that I, THEODORE V. NUTTER, a citizen of the United States, residing at Seattle, in the county of King and State of Washington, have invented certain new and useful Improvements in Portable Hand-Windlasses, of which the following is a specification.

This invention relates to hauling and hoisting devices and has for its object to provide a windlass of small size and light weight to render it convenient to be carried by a man. A further object is to provide a windlass of this character which may be operated without the necessity of securing the frame in a rigid manner to enable its being efficiently used.

With these ends in view, the invention consists in the novel construction, arrangement and combination of parts as will be hereinafter described and particularly pointed out in the appended claims.

In the accompanying drawings, Figure 1 is a plan view of my improved windlass. Fig. 2 is a side elevational view thereof with a portion of the frame broken away. Fig. 3 is an end elevation of the same, part of the swivel hook being omitted. Fig. 4 is a sectional view taken through 4—4 of Fig. 1.

The windlass frame comprises side members 5 and 6 of arcuate shape, preferably, with their convex edges on top; and front and rear end members 7 and 8, all of which are rigidly secured together.

The front end member 7 is formed to provide a plate bearing element 9 with upturned extremities 10 which fit against said side members and through which securing bolts 11 extend. The rear end member 8 is in the nature of a bar which is welded or otherwise secured at its ends to said side members at a distance above the adjacent ends of the side members. The portions of the side members, as at 12, below the end member 8 serve as feet which coact with the bearing plate 9 at the other end of the frame to furnish a stable support for the frame when upon a floor or ground.

Journaled in bearing boxes 13 provided in the frame members 5 and 6 is a transverse shaft 14 upon which is rigidly secured a winding drum 15 for a rope, such as 16.

Secured to or formed integral with the drum 15 at one end is a ratchet wheel 17 and at its other end a brake wheel 18. For said ratchet wheel is provided a pawl 19 pivotally connected to an operating lever 20 which is fulcrumed on the shaft 14. Also provided for said ratchet wheel is a dog 21 pivoted to a bolt 22 extending through the frame member 5 and a lug 23 of the member 8.

The dog 21 is moreover, provided with an arm 24 directed downwardly and forwardly, as shown in Fig. 2, to below the frame member 8. The arm 24 is of sufficient weight to normally effect the engagement of the dog with the teeth of said ratchet wheel and is in position to be moved by the operator's foot to disengage the dog and thus retain it when the drum is to be rotated for unwinding the rope 16. 25 represents a brakeband having one end 26 secured to the frame and, passing about the underside of the brakewheel 18, has its other end secured to a brake operating lever 27. Secured to or formed upon the frame part 9 is rope guide 28 of an inverted U-shape of an internal width somewhat less than the distance between the ratchet and brake wheels 17 and 18 so as to prevent the rope 16 fouling with either of such wheels. Swiveled in the frame member 8 at about its midlength is the shank 29 of a hook 30 having a stub end 31 extending laterally from its bill 32.

The hook proper, it is to be noted, is disposed to one side of the shank 29. To the rear of its swivel connection with the frame the hook shank is square or approximately so in transverse section in order that it may be held in 90° angular rotary positions by engaging in an approximately rectangular recess 33 (Fig. 3) of a keeper 34.

This keeper is pivotally connected to a bolt 35 extending through the frame member 6 and lug 36 on the frame part 8 thereby enabling the keeper to be elevated by the operator's foot to release the shank 29 for turning the hook into or from its full line position or dotted line positions $30^1$ and $30^2$ as represented in Fig. 1. 37 represents a cable, or an equivalent, connected to the hook and secured to any suitable object which will withstand any strains to which the windlass is subjected when pulling or hoisting a load by the rope 16 when being wound about the drum 15.

The ends of the shaft 14 are desirably made polygonal to fit in the socket of a crank handle whereby the drum may be rapidly rotated when taking up slack rope. The levers 20 and 27, as shown, are relatively short, but in practice the effective lengths thereof are selectively extended to afford sufficient leverage by means of an ordinary gas pipe, not shown, which fit over the same.

Such a pipe is also advantageously employed on the stub end 31 of the hook to enable the operator to revolve the hook 30 about the axis of the shank 29 when the windlass is under a strain.

The purpose of thus turning the hook is to have the frame holding cable 37 as nearly as possible in axial alinement with the hauling rope 16 as the latter is coiled about the drum 15 progressively from one end to the other and that too without causing the windlass to be held in skewed relations with the cable and rope.

To effect such results, the hook 30 is regulated to be in its dotted line $30^2$ position (Fig. 1) when the rope 16 is being coiled about the drum end near the ratchet wheel, when approaching the midlength of the drum the hook is brought into its $30^1$ position and when in adjacency to the other end of the drum the hook 30 should be brought into its full line position.

To regulate the hook, the keeper 34 is first raised to disengage the same from the hook shank 29 and reëngage therewith after the hook is turned. Ordinarily, or with light or medium loads, the hook may be turned by the operator using the stub end 31 of the hook as a handle, but with heavy loads a pipe, as hereinbefore mentioned, may be utilized upon the stub end to provide the requisite purchase.

The turning of the hook, moreover, may be effected without interrupting the rotation of the drum, as with one hand the actuating lever 20 can be reciprocated, using his other hand to turn the hook after the keeper 34 has been kicked up with his foot.

The advantages of the present invention are due, first, to the provision of means whereby the windlass can be effectually operated either upon the ground or in elevated position when supported by the cable 37 and rope 16; second, to its light weight and small size; and, third, to the arrangement of parts whereby the operation and regulation of the windlass may be conveniently performed by a single operator.

What I claim is,—

1. In a hand-windlass, a frame having bearing boxes in the side members thereof, a shaft journaled in said boxes, a drum on said shaft, means for rotating said drum, a hook shank swiveled in an end member of said frame to rotate about an axis longitudinal of the latter, a hook formed integral with said shank and directed laterally therefrom, and means engageable with said shank for releasably securing the hook in selected revoluble positions.

2. In a hand-windlass, the combination with a rigid frame comprising side members, a transverse member affording a ground bearing surface at one end of the frame, and a second transverse member secured in elevated relations to said side members at the other end of the frame, of a hook having a shank element which is swiveled in the second named transverse member, and means for releasably securing said hook in selected rotary positions with respect to the axis of its shank connection with the frame.

3. In a hand-windlass, the combination of a frame having a rope guide rigid with one end thereof, a hook for a holding-cable swiveled in the other end of the frame and at approximately the midwidth of the same, means for releasably securing said hook to be in proximity of either side of the frame selectively, a drum rotatably mounted in said frame, and means to rotate said drum.

4. In a hand-windlass, the combination with a winding drum, a shaft therefor, and a rigid frame provided with journal bearings for the drum shaft, of a hook having its shank swiveled to an end of said frame and at approximately the midwidth thereof whereby the hook is adapted to be directed to one side or the other selectively of the longitudinal axis of said frame, a keeper pivotally connected to the frame and engageable with said hook for releasably securing the latter in selected rotary positions.

Signed at Seattle, Washington, this 28th day of June, 1920.

THEODORE V. NUTTER.

Witnesses:
  PIERRE BARNES,
  MARGARET G. SUPPLE.